United States Patent [19]

Bramstedt et al.

[11] Patent Number: 4,838,011
[45] Date of Patent: Jun. 13, 1989

[54] FLUID ACTUATED CLUTCH HAVING FLUID SLIP FITTING SAFETY INTERLOCK

[75] Inventors: Gerd Bramstedt, Zweibrucken, Fed. Rep. of Germany; Mahlon L. Love, Geneseo, Ill.; John J. Hennen, Ottumwa, Iowa

[73] Assignee: Deere & Company, Moline, Ill.

[21] Appl. No.: 157,558

[22] Filed: Feb. 19, 1988

[51] Int. Cl.[4] .............................................. A01D 69/08
[52] U.S. Cl. ........................................ 56/11.7; 56/11.5
[58] Field of Search ..................... 56/11.4, 11.5, 11.7, 56/11.8

[56] References Cited

U.S. PATENT DOCUMENTS

| | | | |
|---|---|---|---|
| 2,535,812 | 12/1950 | Phillips | 56/11.7 |
| 3,599,407 | 8/1971 | Bichel | 56/11.8 |
| 3,701,239 | 10/1972 | Hennen | 56/13.5 |
| 4,122,652 | 10/1978 | Holtermann | 56/11.8 |
| 4,408,685 | 10/1983 | Schilling et al. | 192/85 A |
| 4,455,812 | 6/1984 | James | 56/11.7 |
| 4,483,430 | 11/1984 | Carmichael et al. | 192/91 A |
| 4,663,919 | 5/1987 | Stroh et al. | 56/11.7 |

*Primary Examiner*—Paul J. Hirsch

[57] ABSTRACT

A main drive for crop cutting, conveying and/or processing components of a self-propelled harvester includes an input shaft which extends crosswise to and is coupled for being driven by a longitudinally extending engine output shaft. The input shaft carries a spring-released, hydraulically-engageable disc clutch, which, when engaged, transfers power from the clutch to a multi-grooved belt drive sheave which is coupled to respective driven sheaves of the crop cutting, conveying and/or processing components by a drive belt. The clutch is mounted on the shaft outboard of the drive sheave and the shaft is provided with a fluid passage that extends inwardly from its outboard end and is coupled in fluid communication with the clutch piston. A slip fitting is releasably coupled to the outboard end of the shaft and is adapted for being coupled to a conduit for conveying fluid to or returning fluid from the clutch piston. The shaft includes splined outboard section located between the fitting and the clutch which is adapted for receiving a dynamometer drive element, once the slip fitting is removed, so that the engine output may be checked without any danger of inadvertent clutch engagement.

6 Claims, 2 Drawing Sheets

FLUID ACTUATED CLUTCH HAVING FLUID SLIP FITTING SAFETY INTERLOCK

BACKGROUND OF THE INVENTION

The present invention relates to a main drive line clutch connected between an engine and various driven components of a self-propelled harvester such as a combine or forage harvester, or the like. More specifically, the present invention relates to a hydraulically operable clutch.

It is a known practice to couple a main drive line clutch to the flywheel of an engine. A clutch so embodied does not lend itself to design flexibility since the use of various engines would require the use of a special flywheel. Also, a clutch embodied in this manner does not lend itself to easy assembly or serviceability. U.S. Pat. No. 3,701,239 issued to J. J. Hennen on Oct. 31, 1972 discloses a main drive line embodying such a clutch.

SUMMARY OF THE INVENTION

According to the present invention there is provided a novel main drive line clutch assembly for a self-propelled harvester.

An object of the invention is to provide a main drive line clutch assembly which is arranged for easy serviceability. A related object is to provide a clutch assembly arranged for easy subassembly.

A further object of the invention is to provide a main drive line clutch assembly arranged relative to an input shaft having an easily accessible end adapted for connection to a dynamometer whereby engine output can be monitored. A related object is to provide such a clutch which is hydraulically operable and wherein the assembly includes a control fluid fitting which must be removed in order to permit coupling of the dynamometer thereby ensuring that the clutch will not be accidentally engaged while taking dynamometer readings.

These and other objects, features and advantages of the present invention will become apparent to those skilled in the art from the description which follows and from the drawings.

DESCRIPTION OF THE PREFERRED EMBODIMENT

Figure 1:
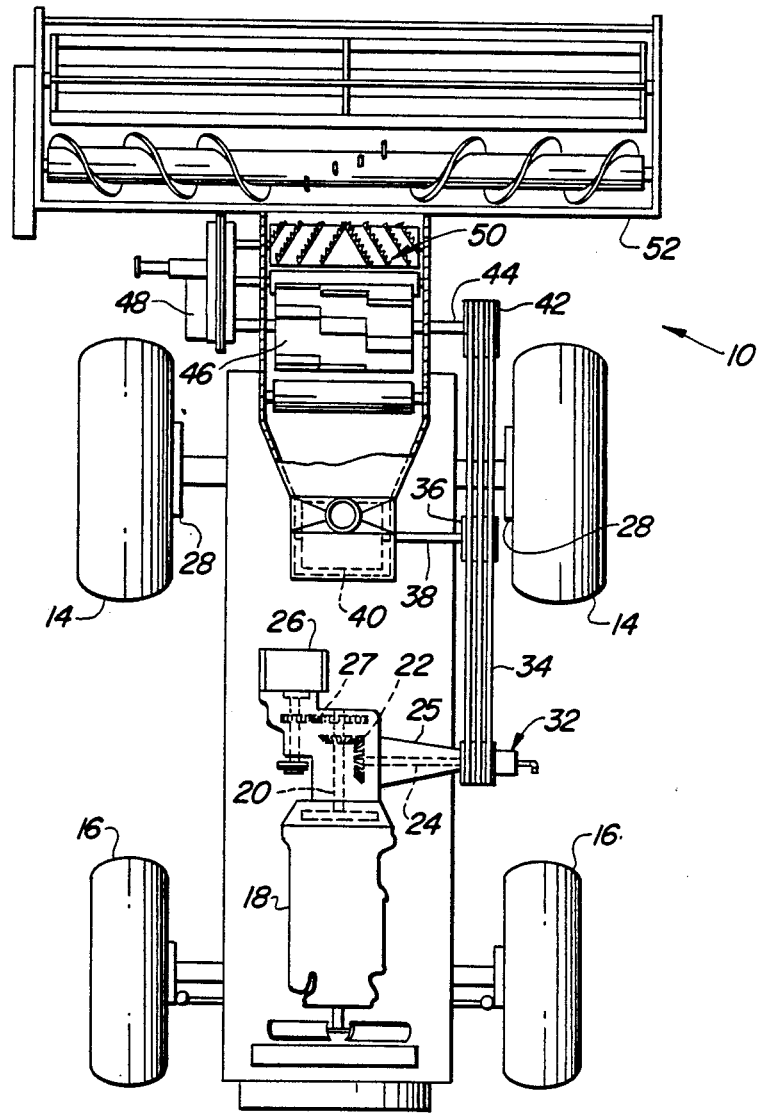
FIG. 1 is a schematic, top plan view of a self-propelled forage harvester having a main drive line embodying a clutch assembly constructed in accordance with the present invention.

Referring to FIG. 1, there is shown a self-propelled harvester 10, here illustrated as a forage harvester including a frame or chassis 12 supported on front and rear pairs of driven wheels 14 and 16, respectively. Power for driving the wheels is supplied by an engine 18 mounted to a rear portion of the frame 12 and including a forwardly projecting output shaft 20 coupled, as by a bevel gear set 22, to a transversely extending drive input shaft 24 rotatably mounted in a rightward projecting housing portion 25 which is attached, as by bolts, for being easily separated from the remainder of the transmission housing. A pump 26 is coupled to the forward end of the shaft 20 by a spur gear set 27 and is coupled in a well-known manner, not shown, for delivering fluid to a pair of hydraulic motors 28 respectively drivingly connected to the front pair of wheels 14. A multiple grooved, main drive sheave 30 is rotatably mounted to the drive input shaft 24 and may be selectively coupled, as described below in further detail, for rotation therewith by a main drive clutch 32 carried on the shaft 24 outboard of the sheave 30. A multiple V-drive belt 34 is received on the sheave 30 and engages a first driven sheave 36, fixed to the outer end of a drive shaft 38 of a blower 40, and a second driven sheave 42 fixed to the outer end of a drive shaft 44 of a cutterhead 46. A transmission 48 is coupled to an outer left end of the shaft 44 and is coupled to drive a feed roll assembly 50 which receives crop from a header 52, located forwardly of the roll assembly and delivers the crop as a relatively compact mat to the cutterhead 46.

Figure 2:
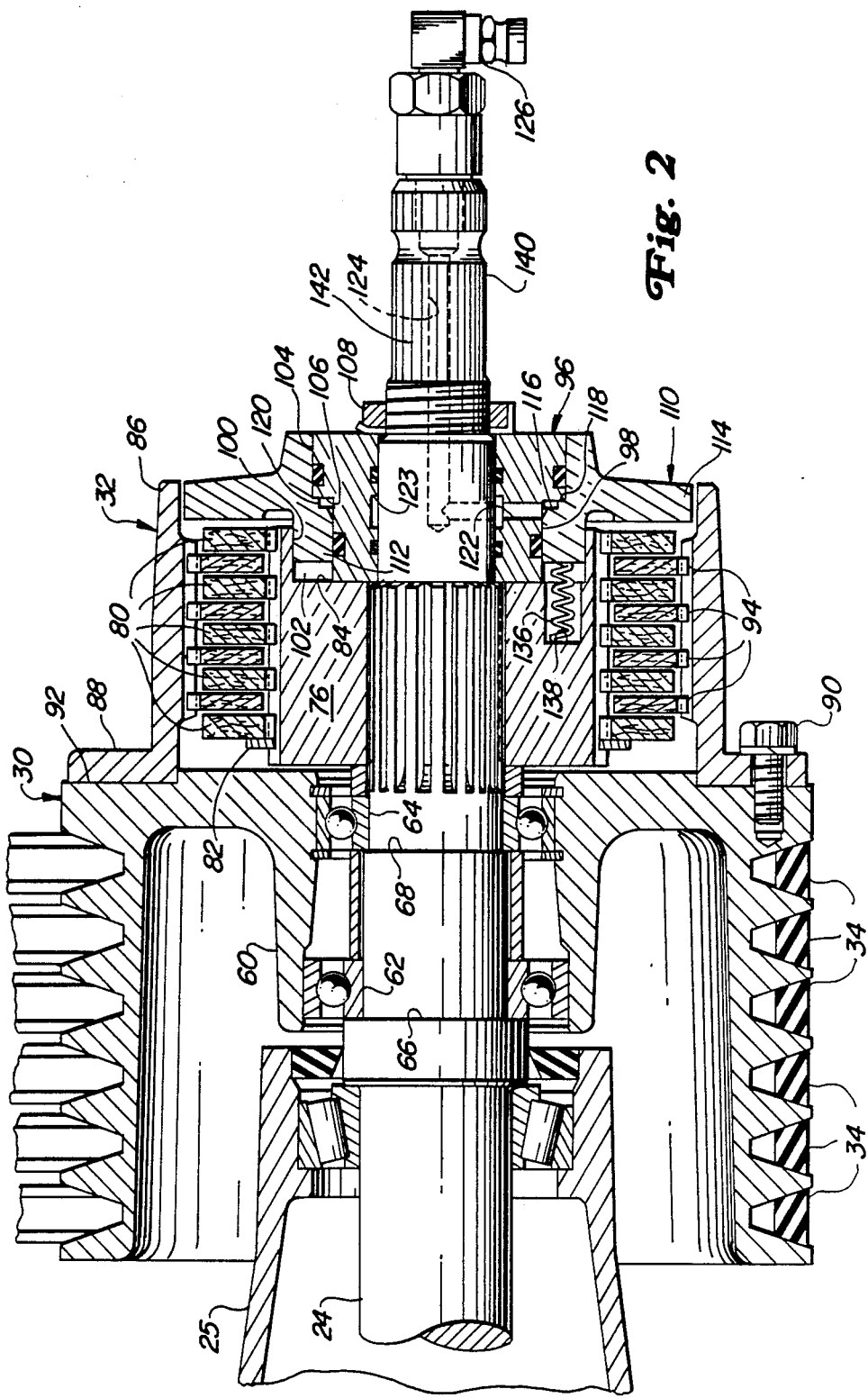
FIG. 2 is an enlarged sectional view of the clutch assembly.

Referring now to FIG. 2, it can be seen that the main drive sheave 30 has a hub 60 rotatably mounted on the drive input shaft 24 by inner and outer roller bearings 62 and 64, respectively, having inner sides of inner races thereof located against respective shaft shoulders 66 and 68, with the outer bearing 62 having its outer race properly axially fixed in the hub 60 by inner and outer snap rings (not shown). A spacer 74 extends between the bearing inner races to correctly position the outer race of the inner bearing 62 within the sheave hub 60.

The main drive clutch 32 is a multiple disc clutch including an internally and externally splined hub 76 having its internal splines received on a splined shaft section 78 located just outwardly of the outer bearing 64, and having a plurality of identical, internally splined clutch drive discs 80 received on its external splines, with the axially innermost disc 80 being kept from shifting inwardly by a snap ring 82. For a purpose explained below, a counterbore 84 is provided in the rightward or axially outer end of the hub 76. An internally splined outer annular ring 86 of the clutch includes an axially inner annular flange 88 secured, as by bolts 90, to an axially outer face 92 of the sheave 30. A plurality of identical, externally splined clutch driven discs 94 are received on the internal splines of the ring 86 and are interleaved with the drive discs 80.

A hydraulic actuator assembly is provided for selectively effecting driving inter-engagement between the discs 80 and 94. This assembly includes an annular fluid manifold 96 slidably received on the drive shaft 24 and having an axially inner section 98 received in the counterbore 84 and cooperating with an inwardly facing surface 100 thereof to form an annular piston-receiving cavity 102. The manifold 96 has an axially outer section 104 which is larger in diameter than the inner section 98 and thus has an annular inwardly facing surface forming a shoulder 106. A nut and lock washer assembly 108 is received on the shaft 24 and holds the manifold tight against the bottom of the counterbore 84. A combined piston and pressure plate assembly 110 includes an axially inner annular piston 112 formed integrally with an axially outer pressure plate 114. The piston 112 is slidably received in the piston cavity 102 and includes an annular working face 116 disposed in opposition to the manifold shoulder 106 and maintained in spaced relationship thereto by an annular, outwardly facing shoulder 118 formed on the assembly axially outwardly of the working face 116 and engaged with the manifold shoulder 106 when the clutch is in a disengaged condition as shown. An annular pressurizable cavity 120 is thus defined between the shoulder 106 and face 116. A radial fluid passage 122 is located in the manifold 96 with its outer end opening into the cavity 120 and its inner end opening into an annular fluid recess 123 formed inside the manifold. A fluid passage 124 extends first axially in the shaft from the axially outer end thereof and then radially to the surface of the shaft at a location in fluid communication with the recess 122. A swivel fitting 126 is provided at the end of the shaft 24 for connecting a hydraulic fluid supply-return line to the passage 124. The inner and outer surfaces of the manifold 96 are each provided with a pair of seal assemblies (not shown) located at opposite sides of the recess for preventing fluid leakage along the shaft 24 and along the inner surface of the piston and pressure plate assembly 110. The pressure plate 114 is disposed for effecting driving inter-engagement between the discs 80 and 84 when the cavity 120 is pressurized to shift the piston 112 axially inwardly to a clutch-engage position. As shown here, pressurized fluid is absent from the cavity 120 and a plurality of clutch release springs 136 (only one shown), located in respective axially extending blind bores 138 arranged in the bottom of the piston-receiving cavity 102, act to hold the piston 112 in an axially outwardly clutch-release position wherein the pressure plate 114 is spaced from the axially outermost drive disc 80.

It can be seen that the shaft 24 includes an exposed section 140 which extends axially outwardly beyond the nut and lock washer assembly 108. The section 140 is provided with splines 142. Since the section 140 is readily accessible from the exterior of the harvester 10, a dynamometer can easily be mounted to the shaft end to measure the power output of the engine. In order to mount the dynamometer, it is necessary to disconnect the fitting 126 and hence the source of fluid pressure for operating the clutch piston 112. In this way, accidental operation of the cutterhead, harvester unit, blower and kernel processor drives is prevented, when checking the power output of the engine, since their operation requires engagement of the clutch.

Also, it will be appreciated that the main drive clutch 32 and main drive sheave 30 are easily accessible for servicing and repair or the like and that they can be assembled as a subassembly together with the drive shaft 24 before mounting the drive shaft 24 for being driven from the engine output shaft 20.

We claim:

1. In a self-propelled harvester including a plurality of crop gathering and/or processing components each including a transversely extending drive shaft carrying a driven sheave at its outboard end, an engine having an output shaft coupled for driving a transversely extending, main drive input shaft, a multi-groove main drive sheave mounted on the input shaft and drive belt means coupled between the drive and driven sheaves, the improvement comprising: said drive sheave being freely rotatably mounted on the input shaft; a hydraulically operable clutch having a first portion mounted for rotation with said input shaft, a second portion mounted for rotation with said drive sheave and hydraulically actuatable means including an axially shiftable piston for selectively effecting a driving connection between the first and second clutch portions upon pressurizing said piston; said input shaft having a splined section extending outboard of the clutch and drive sheave and adapted for receiving a dynamometer drive element whereby the engine output can be easily measured; a clutch fluid passage means coupled to the piston for conveying fluid to and from the piston and including a fluid passage extending axially in the input shaft from an outboard end of the shaft and including a slip fitting normally mounted to the axially outer end of the input shaft and being removable for allowing mounting of the dynamometer drive element of the splined section of the shaft whereby inadvertent pressurization of the clutch for effecting driving of the drive sheave is prevented when checking the engine output.

2. The self-propelled harvester defined in claim 1 wherein said clutch is located outboard of said drive sheave thereby making the clutch easily accessible for servicing.

3. The self-propelled harvester defined in claim 1 wherein said input shaft has a first portion upon which said drive sheave is freely rotatably mounted and a second portion outboard of and stepped down in diameter to the first portion and having the first clutch portion fixed thereto for rotation therewith; and said splined section being outboard of and stepped down in diameter relative to said second portion whereby said clutch and drive sheave may be pre-assembled together on the input shaft by sliding the parts over the outboard end of the shaft.

4. In a self-propelled forage harvester including a cutterhead and a blower for receiving crop from the cutterhead, the cutterhead and blower each including a transverse drive shaft having a sheave coupled to an outboard end thereof, an engine having an output shaft coupled for driving a transversely extending main drive input shaft, a multi-groove main drive sheave mounted on the input shaft and drive belt means coupled between the main drive sheave and the respective sheaves of the cutterhead and blower drive shafts, the improvement comprising: said drive sheave being freely rotataby mounted on the input shaft; a hydraulically operable clutch having a first portion mounted for rotation with said input shaft, a second portion mounted for rotation with said drive sheave and hydraulically operable means including an axially shiftable piston for selectively effecting a driving connection between said first and second clutch portions upon pressurizing said piston; and said clutch being outboard of said drive sheave whereby it is easily accessible for service.

5. The self-propelled forage harvester defined in claim 4 wherein said clutch includes an annular fluid manifold located outboard of the clutch first portion and including a radially inner annular groove forming a fluid-passage about the input shaft; said input shaft having an axial passage extending axially therein from an outboard end thereof and a radial passage connecting the axial passage to the annular groove; and said manifold having a radial passage connecting said groove to the piston.

6. The self-propelled harvester defined in claim 5 wherein said input shaft includes a splined section extending outboard of said clutch and drive sheave and adapted for receiving a drive element of a dynamometer when it is desired to check engine output; and a fluid fitting adapted for connection to a clutch fluid supply-return line normally being coupled to an outboard end of the input shaft in fluid communication with the axial passage and preventing mounting of a dynamometer drive element on the shaft splined section whereby the fitting must be removed to permit connection of the dynamometer drive element with the input shaft and thereby establishes a condition preventing inadvertent pressurization of the clutch, and, hence, driving of the cutterhead or blower when checking engine output.

* * * * *